Sept. 5, 1933.  T. V. HEMMINGSEN  1,925,755
SHAFT ANGULARITY ADJUSTING DEVICE
Filed June 28, 1929
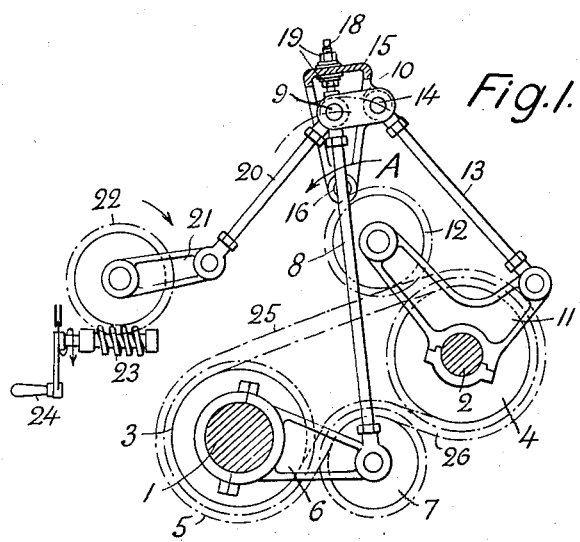
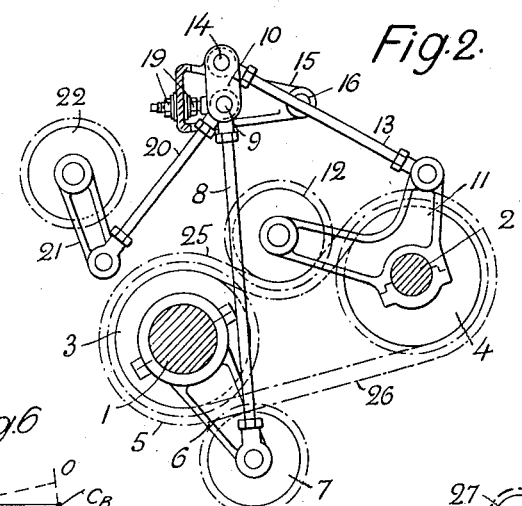
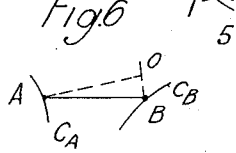
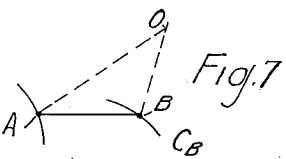
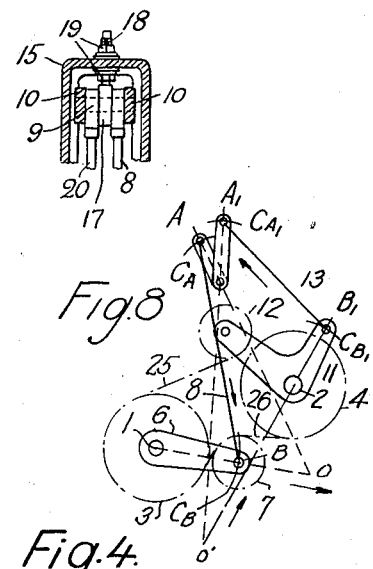
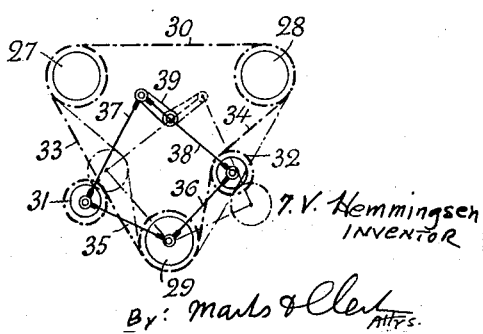

Patented Sept. 5, 1933

1,925,755

UNITED STATES PATENT OFFICE 1,925,755

SHAFT ANGULARITY ADJUSTING DEVICE

Torkild Valdemar Hemmingsen, Copenhagen, Denmark

Application June 28, 1929, Serial No. 374,549, and in Denmark July 14, 1928

7 Claims. (Cl. 64—5)

The invention relates to a device by which the phase angle or relative angular displacement between shafts connected with each other by a chain gearing may be changed, and which device comprises adjustable idlers, by the adjustment of which the chain parts may be laid in various curves, so that e. g. by hand regulating means or the like one or more of the shafts may be adjusted through a certain angle relatively to another shaft. Shafts connected with each other by a chain gearing are employed in several engines, particularly in internal combustion engines, where the crank shaft drives by a chain gearing one or more cam shafts or other shafts having to rotate simultaneously with the crank shaft. Among such shafts may be mentioned e. g. the shaft of the igniting dynamo, the shaft controlling the fuel pump, or shafts serving to move valves or slide valves or the like connected with the controlling means of the engine. The invention is particularly intended for use in connection with shafts which require adjustment when the combustion engine is reversed, in which case e. g. the angular displacement of the cam shaft relatively to the crank shaft must be so changed as to comply with the revolving of the engine in the opposite direction to that in which it revolved before the reversal. Devices are known, in which two idlers are employed, the motion of which in relation to each other is limited to a certain amount in order to keep the chain tight, both idlers being situated at the inner side of the chain and affected by a spring which tends to move them away from each other. According to the invention idlers are employed which are mutually positively controlled by means of link work or linkage or the like in such a manner that the idlers are assuredly in constant engagement with the chain during the adjustment and keep it tight in all positions. The idlers may be changed from one end position into another, and these end positions are generally so arranged that an idler being in one end position thrusts the greatest bend on the chain part in question, while in the other end position it allows the chain part to run straight. As two or more idlers have always to be adjusted (displaced) in order to straighten or bend inwardly or outwardly two or more parts of the gear chain, the idlers may advantageously be connected to link-work or linkage or the like which may be adjusted by hand control or the like, so that by one single manipulation all idlers may simultaneously be moved from one end position into the other. During this operation the idlers are obliged to follow certain previously fixed paths. The adjusting means may consist of rods or links connected with the adjustable system, or the latter may be operated by cams, curves or the like. If the device is applied to reversing mechanisms of internal combustion engines the reversing member of the engine or other parts moving during the reversal may be connected with the said rods, links, curves, cams or the like, so that the idlers are automatically brought into the correct positions when the reversing members of the engine are acted upon. In the accompanying drawing is represented what is necessary to make the invention understood.

Fig. 1 shows a constructional form of the invention in its use in an engine having a cam shaft driven from the main shaft of the engine. Fig. 2 shows the same device with its idlers in another position than in Fig. 1. Fig. 3 is a section through a detail of the connecting system shown in Figs. 1 and 2. Fig. 4 shows a constructional form of the device in its use in an engine, the main shaft of which actuates two cam shafts or the like. Figs. 5 to 7 are diagrams illustrating the principles of the invention. Fig. 8 corresponds structurally with Fig. 1, but shows the momentary points or axes of rotation of the rods actuating the idlers, the curves followed by the rod ends and the perpendiculars to the end points of the rods.

In order to make the invention clear, reference is first taken to Figs. 5–8.

In Fig. 5, A—B represents a line the end points A and B of which move along curves $C_A$ and $C_B$. The momentary point O of rotation of the line A—B is defined as the point of intersection of the normals (the perpendiculars) to the curves $C_A$ and $C_B$ struck from the points A and B.

If the line A—B is substituted by a rod which slides upon two flats or curves $C_A$ and $C_B$ and is moved from one end, for instance from the end A, the force necessary for the movement of the rod will depend upon the position of the momentary point or axis of rotation O in relation to the rod A—B. If the point O comes near to the point B as indicated in Fig. 6 the rod A—B will be in or near a position which may be termed a dead point position. In such a position, the application of a great stress on the rod will produce only a small tangential force at the end point A so that the rod may be easily moved from the end A, whilst a movement of the rod from the point B will necessitate a very great force. The position of the point of rotation O indicated is therefore suitable when the rod is moved from the end A as the rod in the position indicated may be termed as a locked position. The other dead point position, that is with the momentary point of rotation O lying near the point A is, of course, not employed if the rod is to be moved from the end A. The curves $C_A$ and $C_B$ are therefore so arranged that the point of rotation lies a great distance from the point A and preferably so that the distance A—O is never smaller than the length of the rod A—B.

If the momentary point of rotation O as indicated in Fig. 7 lies a great distance from both of the ends of the rod A—B a small movement $ds_A$ of the point A will cause a small movement $ds_B$ which latter movement will substantially correspond with the first mentioned movement. However, the relation between the movements of the points A and B depends upon the relation between the distances O—A and O—B. For instance, in the position indicated in Fig. 6 the movement $ds_B$ of the point B is much smaller than the corresponding movement $ds_A$ of the point A.

This principle has been employed in the present invention as when a chain is to be tightened by means of an idler, the idler will have to make a relatively large movement in order to produce a certain stress in the chain if the latter is straight running and tangential to the idler, whereas only a relatively small movement of the idler is necessary to stretch the chain in the same degree if the chain is curved and overlies a part of the periphery of the idler.

The purpose of the invention is to vary the relative angular displacement between shafts connected by a chain gearing, by adjusting the idlers, and more especially to effect the variation in such a manner that the stress or tension of the chain remains unaltered. In conformity with the above stated purpose it therefore will be necessary that the idler which coacts with a straight or only slightly curved portion of the chain receives a greater movement than the other idler which coacts with a more sharply curved portion of the chain.

According to the invention each of the idlers is moved from a rod, the end points of the rods A—B; $A_1$—$B_1$, Fig. 8 being forced to follow definite curves, namely such curves that the momentary axis of rotation O respectively $O_1$ for each rod alters its position by moving inwardly towards the end of the rod nearest the idler, when the corresponding part of the gear chain bends, and, on the contrary, the momentary point of rotation of the rod moves away from said end when the corresponding part of the chain straightens. Thus, it is obtained that the idlers during their adjustment, move with different speeds depending on the different curvatures of the chain so that the chain is maintained at a uniform tension.

The end points A, $A_1$ may in some cases preferably be coincident or at any rate the ends A, $A_1$ may be so mutually connected that the idlers can be moved by means of a single lever or the like. In the constructional form of the invention shown in Figs. 1 and 2, 1 designates the main shaft of the engine, while the cam shaft is designated by 2. A sprocket wheel 3 is keyed to the main shaft 1, and in the same way an equally large sprocket wheel 4 is mounted on the cam shaft 2. Around the sprocket wheels 3, 4 runs an endless chain 5 with two chain parts 25, 26. The main shaft 1 carries a lever 6 at the end of which is a pivot carrying an idler 7, which is provided—as are also the sprocket wheels 3, 4—with teeth to engage the chain 5. The end of the pivot of the idler 7 is engaged by an eye or head of a connecting rod 8, the other end of which is rotatably mounted by an eye or head on a pin 9 of a double or forked lever 10 (see also Fig. 3). The lever 10 again is rotatably mounted on a pivot 14 situated on a bell crank lever 15, which is pivoted on a fixed pivot 16 so as to be able to swing from the almost vertical position shown in Fig. 1 to the almost horizontal position shown in Fig. 2. Corresponding to the idler 7 movable around the main shaft 1 and its actuating members the cam shaft 2 carries a bell crank lever 11, one arm of which carries an idler 12. The other arm of the lever 11 is connected by a connecting rod 13 with the pivot 14 of the bell crank lever 15. The above mentioned pin 9 on the lever 10 engages one eye of a connecting rod 20, the other eye of which is rotatably connected with a lever 21 rigidly connected to a worm gear 22 meshing with a worm 23 which may be rotated by a crank handle 24. For adjusting purposes the lever 10 is double or forked as above stated and as shown in Fig. 3 and pivoted on the pin 14 of the bell crank lever 15. At its other end the lever 10 carries the pin 9 of connecting rods 8, 20. Furthermore, the pivot 9 passes through a head 17, Fig. 3, provided for adjusting purposes with a threaded bolt 18 which may be adjusted relatively to the bell crank lever 15 by nut and locknut 19. The device acts in the following manner:—

When the phase angle between the cam shaft 2 and main shaft 1 is to be changed, the crank handle 24 is rotated. When the idlers 7, 12 are to be moved from the position shown in Fig. 1 to that of Fig. 2, the crank handle, Fig. 1, is rotated in the clockwise direction which rotation is transmitted through the worm 23, worm gear 22, lever 21 and connecting rod 20 to bell crank lever 15 which rotates in the direction indicated by the arrow A, Fig. 1. During the first part of the rotation there will be a relatively small angular movement of the lever 6 with idler 7, so that the curve formed by the chain part 26 will become somewhat straightened. In the same period there will be a relatively great angular movement of lever 11 with the result that the idler 12 is so displaced that the chain part 25 forms a curve. The shape and motion of the linkwork or linkage is so arranged that the idlers remain in constant engagement with the chain parts and so that the shortening of the curve length taking place in the chain part 26 is just equal to the augmentation of curve length given to the part 25. For this purpose the motion of the idler 12 must be greater during the first part of the rotation than that of the idler 7. At the end of the reversal circumstances are also reversed as to the motions of the idlers, as will appear from Fig. 2, a comparatively great motion of the idler 7 corresponding only to a comparatively small motion of idler 12. During the reversal from the position shown in Fig. 1 to that shown in Fig. 2 the angular motions of idler 7 will increase while those of idler 12 will decrease simultaneously according to the general rule of the motions of cranks and connecting rods, or in the present case a rod of definite length (rod 8 or 13) bound to follow two circles. At the same time as the idlers 7, 12 are moved from the positions in Fig. 1 to those in Fig. 2, the phase angle or relative displacement of the main shaft 1 and cam shaft 2 is changed. Regarding the main shaft 1 as stationary, the decrease of curve length of part 26 will be seen to be transmitted to part 25 as an increase of curve length, so that the chain wheel 4, and consequently the cam shaft too, is rotated through a corresponding angle relatively to the main shaft. The levers carrying the idlers need not be pivoted on the same axles carrying the chain wheels 3, 4. Normally levers 6, 11 carrying the idlers are, however, rotatably mounted on stationary axles, so that the curves in which the axles or pivots of the idlers are moved become circles, and for the sake of convenience, the levers 6, 11 are made to rotate about the shafts 1, 2 of the power transmission itself. According to the constructional form shown diagrammatically in Fig. 4 there are three shafts 27, 28, 29 connected by a chain 30. Two idlers 31, 32 serve to lay the parts 33, 34 of the chain into various curves. The axles or pivots of the idlers 31, 32 are situated on parts of an adjustable rod or link system or the like. The idler 31 is carried by a lever 35 pivotally mounted with reference to the axis of the shaft 29. The idler 32 is also mounted on a lever 36 pivotally mounted with reference to the same axis as lever 35. The pins of idlers 31, 32 are connected by rods 37, 38 with a lever 39 corresponding fully to lever 15, Figs. 1 and 2. When the lever 39 is rotated about its stationary pivot, the system of levers and therewith also the idlers 31, 32 are shifted from the position shown in full lines in Fig. 4 to that indicated in dotted lines. Hereby is obtained that the chain part 33, which was first straight, is now laid in curve at the same time as the chain part 34, which lay first in curve, becomes straight. The result of the chain altering its shape is that two of the shafts, e. g. 27, 28, are adjusted to another phase angle relatively to the shaft 29. The invention is not limited to only two or three shafts, but may be used by any number of shafts connected by chain gearing. Nor is it limited to cases of only two of the chain parts being influenced by idlers, the use of idlers as the above described in combination with more than two parts of the chain not being beyond the anticipation of the present invention. The idlers may be guided in curves or straight lines and may bend the chain parts inwardly or outwardly. The guiding of the idlers must be correctly adjusted in each individual case, the rule of motion of the individual idlers being determined by the shape of the path and by the amount of motion of the idler from one position to the other when moving along this path relatively to the motion of the other idler or idlers with which it cooperates during the motion from one end position to the other.

I claim:—

1. In combination, a plurality of shafts, a drive chain connecting said shafts and having sufficient length to permit a relative angular displacement of the respective shafts, and means engageable with the chain at various points throughout the length thereof to effect movement of one portion of the chain with respect to another portion thereof whereby to effect angular displacement of one shaft relative to another, said means engaging the chain including idlers in permanent engagement with the chain, a separate rod for moving each of the idlers, one end of each rod actuating the corresponding idler, controlling means connected to the other end of said rods for controlling their movement through definite paths.

2. In combination, a plurality of shafts, a drive chain connecting said shafts and having sufficient slack therein to permit a relative angular displacement of the respective shafts, and means engageable with the chain at various points throughout the length thereof to effect movement of one portion of the chain with respect to another portion thereof whereby to effect angular displacement of one shaft relative to another, said means engaging the chain including fulcrumed idlers in permanent engagement with the chain, a separate rod for moving each of the idlers, one end of each rod actuating the corresponding idler, fulcrumed controlling means connected to the other ends of said rods for controlling their movement, the length of the rods and the location of the fulcrums of the idlers being calculated to cause the momentary point of rotation of each rod to move toward the end of the rod nearest the idler, when the corresponding part of the gear chain bends, and to cause said point to move away from said end when the corresponding part of the chain straightens.

3. An arrangement as claimed in claim 2, in which the fulcrums of the idlers and their controlling means are so arranged that the distance between the controlled end of the rod and the momentary point of rotation of the rod is never smaller than the length of the rod.

4. An arrangement as claimed in claim 1, characterized in that the idlers are fulcrumed on the shafts connected by the drive chain.

5. An arrangement as claimed in claim 1, characterized in that the rods moving the idlers are controlled by means of a single lever.

6. An arrangement as claimed in claim 2, in which the fulcrums of the idlers and their controlling means are so arranged that the rod associated with an idler engaging a sharply curved portion of the chain assumes a substantially dead point position above which further movements of the idler by itself is practically not possible, the momentary point of rotation of the rod actuating the idler lying in line with or near the said rod in the said position.

7. An arrangement as claimed in claim 1, characterized in the provision of adjusting means for adjusting the radius of the paths of the controlled ends of the rods actuating the idlers.

TORKILD VALDEMAR HEMMINGSEN.